Figure 1:
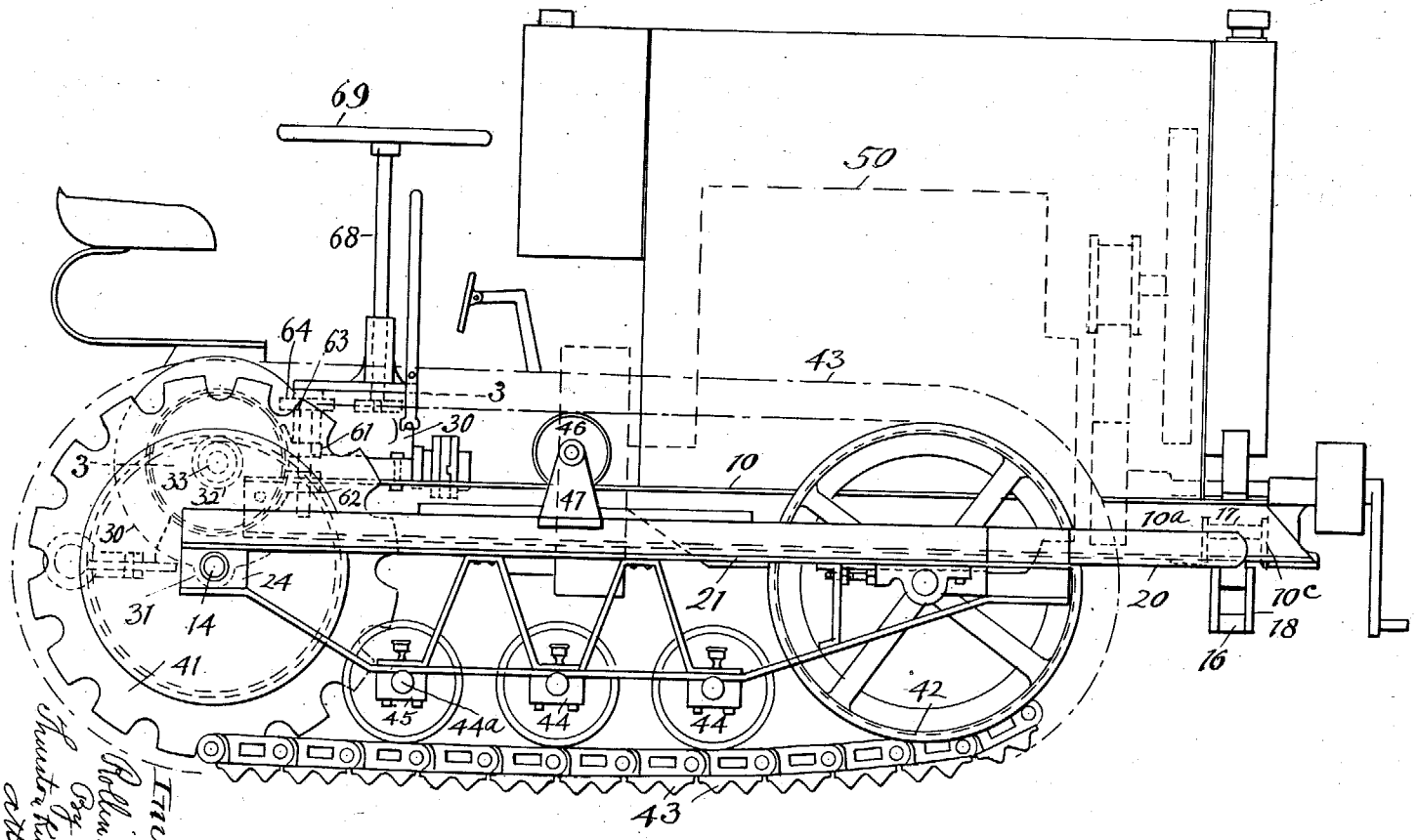

R. H. WHITE.

TRACTOR.

APPLICATION FILED DEC. 6, 1919.

Reissued Aug. 24, 1920.

14,938.

4 SHEETS—SHEET 1.

Inventor:
Rollin H. White
By
Thurston, Kion & Hudson
Attys.

R. H. WHITE.

TRACTOR.

APPLICATION FILED DEC. 6, 1919.

Reissued Aug. 24, 1920. 14,938.

4 SHEETS—SHEET 2.

Inventor
Robert H. White
By
Thurston Kurz
and Hudson
Attys

R. H. WHITE.

TRACTOR.

APPLICATION FILED DEC. 6, 1919.

Reissued Aug. 24, 1920.

14,938.

4 SHEETS—SHEET 3.

Inventor
Rollin H. White
By
Thurston Ross & Hudson
attys.

R. H. WHITE.

TRACTOR.

APPLICATION FILED DEC. 6, 1919.

Reissued Aug. 24, 1920.

14,938.

4 SHEETS—SHEET 4.

Inventor:
Rollin H. White
By Thurston Kent & Hudson
attys

UNITED STATES PATENT OFFICE.

ROLLIN H. WHITE, OF CLEVELAND HEIGHTS, OHIO, ASSIGNOR TO THE CLEVELAND TRACTOR COMPANY, OF EUCLID, OHIO, A CORPORATION OF OHIO.

TRACTOR.

14,938. Specification of Reissued Letters Patent. Reissued Aug. 24, 1920.

Original No. 1,253,319, dated January 15, 1918, Serial No. 137,964, filed December 20, 1916. Application for reissue filed December 6, 1919. Serial No. 343,093.

*To all whom it may concern:*

Be it known that I, ROLLIN H. WHITE, a citizen of the United States, residing at Cleveland Heights, in the county of Cuyahoga and State of Ohio, have invented a certain new and useful Improvement in Tractors, of which the following is a full, clear, and exact description.

This invention relates to what are commonly known as chain tread tractors; and has for its object to provide a cheap, efficient, durable and easily manageable machine of this character.

The invention consists in the construction and combination of parts shown in the drawings, and hereinafter described and pointed out definitely in the appended claims.

Figure 2:
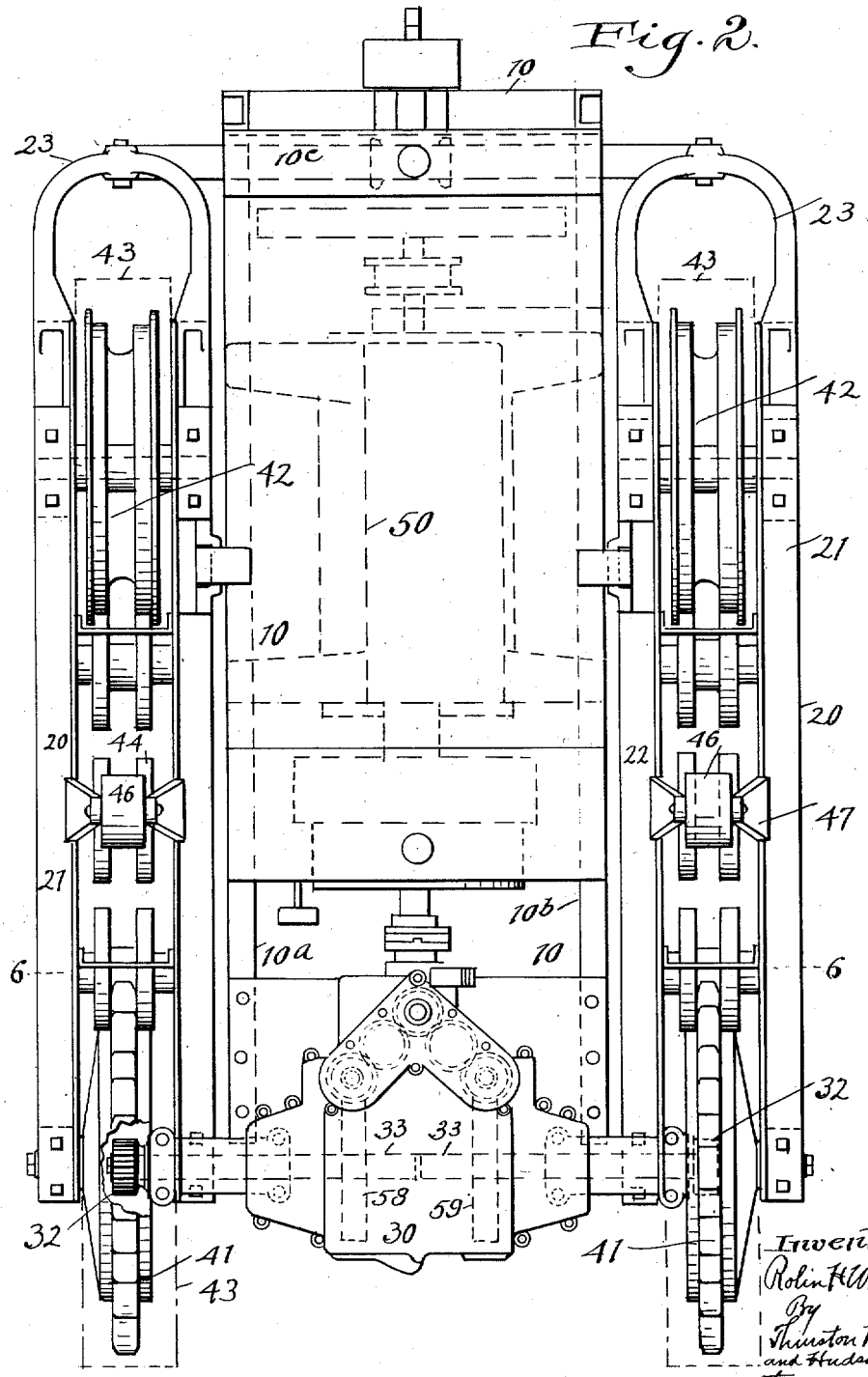
Figure 3:
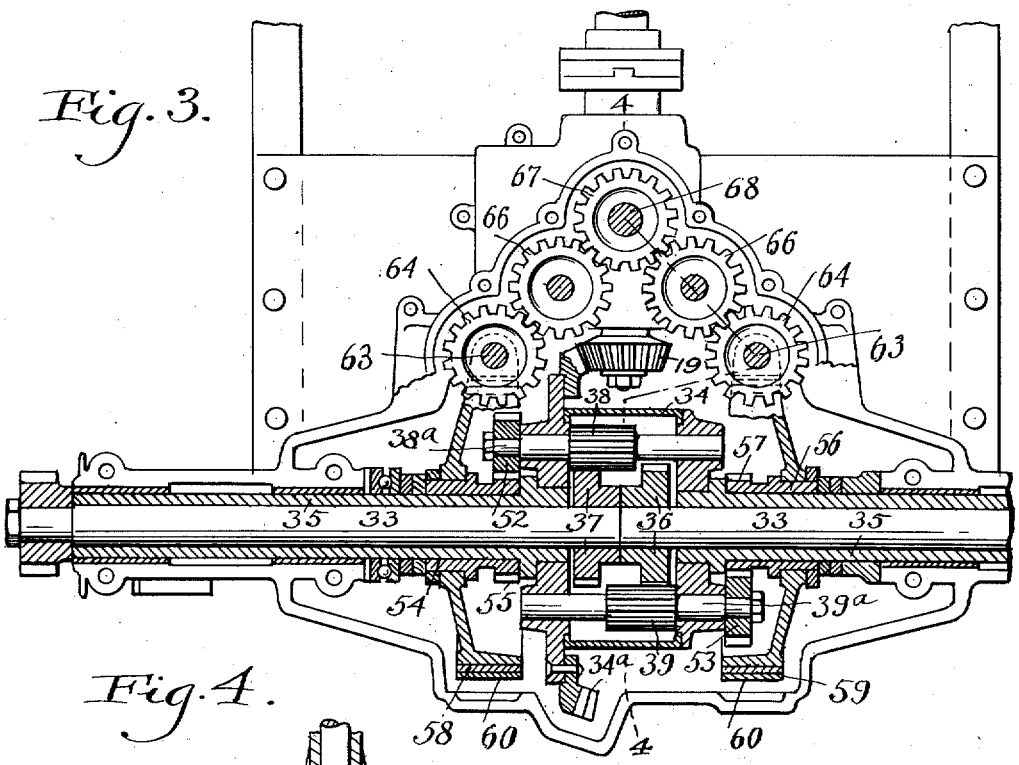
Figure 4:
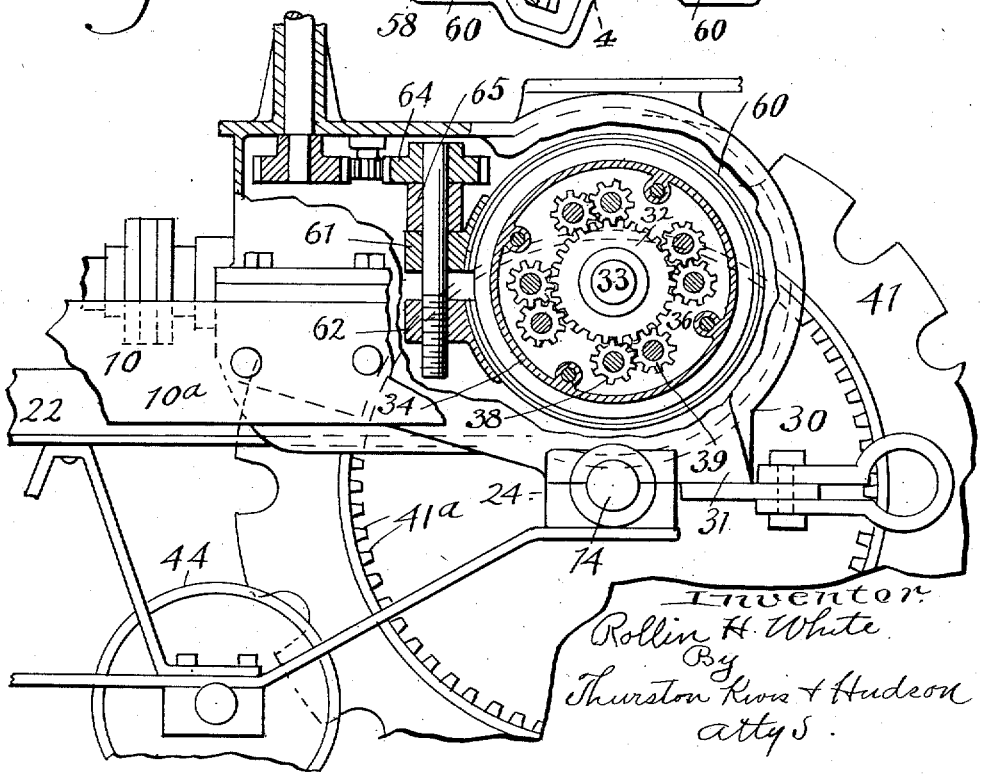
Figure 5:
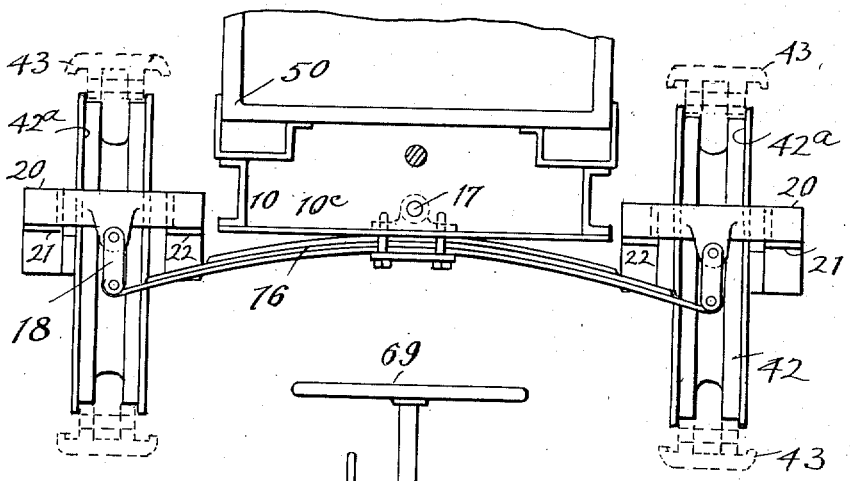
Figure 6:
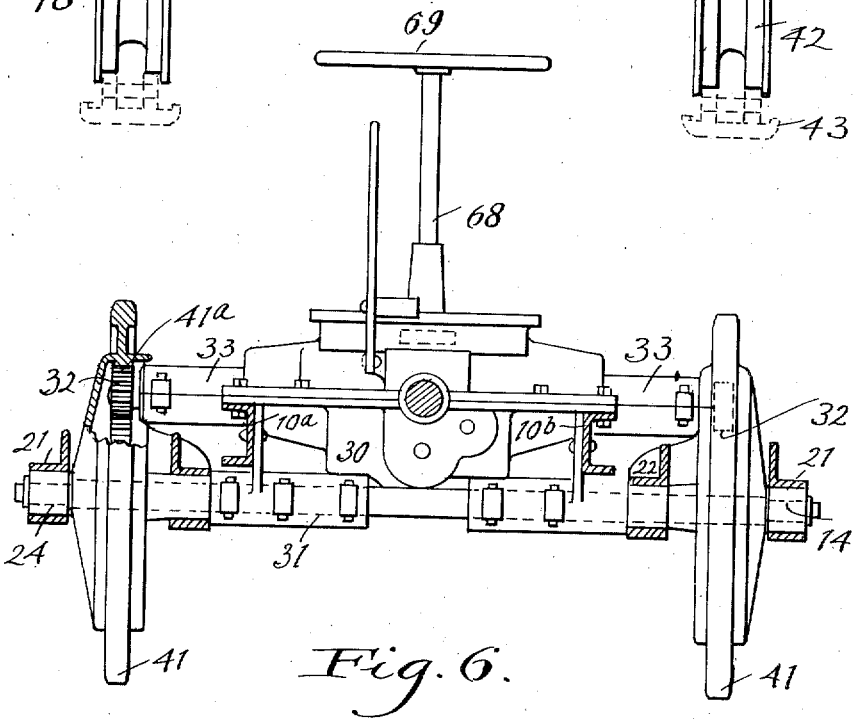

In the drawings, Figure 1 is a side elevation of a tractor which embodies the present invention; Fig. 2 is a plan view of the tractor before the chain treads and motor are applied; Fig. 3 is a sectional plan of the gear casing, the section being in two planes as indicated by line 3—3 on Fig. 1; Fig. 4 is a vertical section in the plane indicated by line 4—4 on Fig. 3; Fig. 5 is a front view of the tractor vehicle; and Fig. 6 is a sectional rear view of so much of the vehicle as is shown in Fig. 2, said section being in the plane of line 6—6 on Fig. 2

A rigid rectangular main frame 10 supports the motor 50. The gear case 30 extends between and is connected with the two side members $10^a$, $10^b$, of said frame and forms the rear member of the main frame. The front ends of said side bars are connected by a transverse member $10^c$.

At each side of the main frame is a traction frame 20; and these two traction frames at their rear ends are hinged to the rear end of the main frame by means of the laterally projecting ends of the rear axle 14.

Each traction frame is composed of two parallel, built-up, vertical beams 21, 22, which are rigidly connected at their front ends by the $^c$yoke 23. The rear axle 14 is fixed to the main frame, being clamped to downward extensions 31 of the gear case 30, as clearly shown in Fig. 6. Each projecting end of said rear axle is rotatably fitted within two alined journal boxes 24 fixed respectively to the side beams of a traction frame, wherefore the rear axle serves, as before stated, as the pivot on which the traction frames are hinged to the main frame.

The front end of the main frame is supported from the front ends of the two traction frames by a leaf spring 16, the middle part of which is pivoted on a longitudinally extended pivot 17 to the front transverse member $10^c$ of the main frame, while the ends of said leaf spring are connected by shackles 18 with the front ends of the traction frames. By reason of the described connection between the main frame and the two traction frames, the latter are permitted to have a very desirable degree of independence of movement both with respect to the main frame and with respect to each other.

Associated with each traction frame is a driving traction wheel 41 which is mounted to rotate on the rear axle between the side members of the traction frame. Likewise a flanged traction wheel 42 is idly mounted on each traction frame between the side members thereof, and near their front ends, and in line with the driving traction wheel. An endless link chain traction belt 43 of any suitable construction, embraces the two traction wheels on each side of the machine,—the links being of such width that they may go between the two flanges $42^a$ of the front idling traction wheel, and be guided thereby. Each rear traction wheel 41 is in the form of a sprocket which is adapted to engage and drive the associated traction belt. Several wheels 44 are disposed between the side members of each traction frame; and the axles $44^a$ of these wheels are rotatably mounted in boxes 45 fixed to the side members of said traction frames. These wheels engage the lower leg of the traction belt, and thereby help it to support the weight of the machine, and likewise they increase the traction of the belt upon the ground. The upper stretch of each traction belt may be supported by a roller 46 mounted in brackets 47 fixed to the traction frame.

Each rear traction wheel 41 has an internal gear $41^a$ which is engaged by a pinion 32. The two pinions which engage respectively with these two internal gears are fixed to the outer ends of two alined driving shafts 33. These two driving shafts are rotated by power transmitted from the motor through differential gearing which in many respects is of familiar form, said gearing being inclosed within and mounted on the gear case 30.

This differential gearing includes a differential drum 34 having a ring gear 34[a], by means of which the drum may be turned in either direction by the bevel pinion 19 which may have any suitable connection with the motor. This differential drum is provided with two oppositely extended elongated hubs 35 which are rotatably mounted in said gear case. The two driving shafts 33 extend through these hubs respectively and are rotatable therein. Gears 36, 37, are respectively secured to the inner ends of the two driving shafts 33 within said drum. Two sets of compensating pinions 38, 39, are located within this drum and are rotatably mounted thereon on axes which are parallel with the axis about which said drum turns. The pinions 38 of one set engage the gear 37, while the pinions 39 of the other set engage the pinion 36. Likewise the compensating pinions of the two sets are grouped in pairs, and a pinion 38 of one set is in mesh with a pinion 39 of the other set. Those familiar with this art will understand that a single pair of intermeshing compensating pinions 38, 39,—one of which pinions is in mesh with a gear 37, and the other with a gear 36,—will transmit motion from the differential drum to the two axle shafts, and will transmit reverse motion from one axle shaft to the other. In case only one such pair of compensating pinions is provided, each of the so-called "sets" of compensating pinions will consist of one pinion only.

To the extent above explained, this differential mechanism is of familiar form, and is of the sort commonly designated a spur gear differential.

At least one of the pinions 38 is rigidly connected with a shaft 38[a] which projects out through one end of the differential drum,—which shaft has the gear 52 secured to its outer end. So also is one of the pinions 39 fixed to a shaft 39[a] which projects through the other end of the drum; and this projecting shaft has a gear 53 fixed to it. These two shafts 38[a], 39[a], are parallel with the shafts 33, and they are rotatively supported upon the differential drum, having their bearings in the end walls through which they respectively project.

Rotatably mounted upon the two hubs 35 of the differential drum but held against longitudinal movement thereon are two brake drums 58, 59. The hub 54 of the brake drum 58 carries a pinion 55 which meshes with the gear 52, while the hub 56 of the brake drum 59 carries a gear 57 which meshes with the gear 53.

When no braking pressure is applied to either of these two brake drums the described mechanism will function precisely like an ordinary spur gear differential; that is to say, the rotation of this differential drum will cause the two driving shafts 33 to turn in the same direction and in approximate unison with each other and the drum but will permit them to turn at slightly different rates according to circumstances. The turning of these shafts 33 in one direction or the other will through the engagement of the pinions on their outer ends with the internal gear on the traction wheels rotate said traction wheels and therefore cause the traction belts to travel in the usual manner and therefore cause the tractor to move forward or backward according to their direction of travel.

The tractor is steered, *i. e.*, caused to turn to right or left by the application of braking pressure to one or the other of the two brake drums 58, 59.

The application of braking pressure to either of the drums does not materially consume power. It merely causes a redistribution of the power through the action of the planetary and differential gearing which has been described. If, for example, braking pressure be applied to the right hand brake drum 59 its rate of rotation will be checked. The result will be that, as the differential drum continues to rotate, the gear 53, by reason of its engagement with the pinion 57, fixed to said brake drum will be turned upon its axis, and this will turn the intermeshing compensating pinion 39, and this will cause the gear 36 and right driving shaft 33 to be positively turned backward in its bearings in the hub of the drum. It will not turn backward as fast as the drum is turning forward, wherefore the net result will be that said right hand driving shaft 33 will continue to turn forward with respect to the supporting gear case but at a reduced rate of speed; that is to say, it will rotate at a slower rate than the differential drum. The turning of the compensating gear 39 as stated will cause the compensating gear 38 to be turned in the reverse direction upon its axis, and this will turn the gear 37 and the left driving shaft 33 forward with respect to the drum; that is to say, it will cause the positive rotation of said shaft 33 in the hub of the differential drum; the net result being that the left driving shaft will rotate faster than the differential drum. Therefore, the left hand traction wheel and associated traction chain will move much faster than the right hand traction wheel and traction belt, with the result that the tractor will turn to the right. By applying the braking pressure to the left hand brake drum the coöperative action of the coresponding parts will cause the speed of the left hand driving shaft 33 to be reduced and the speed of the right hand driving shaft 33 to be correspondingly increased, with the result that the tractor will turn to the left.

While there is a variety of means which could be used to apply at will braking pressure to these two brake drums, the means shown for this purpose consists of the following parts, to wit:—Around each brake drum is a split brake band 60. To this brake band, near its ends, two blocks 61, 62, are fixed. A screw 63 passes through and is rotatable in the upper block 61, and a bearing 65 which is a part of the gear case, and screws into the lower block 62. A gear 64 is fixed to the upper end of the screw 63. Therefore, by turning this screw clockwise the two ends of the brake band are drawn together and caused to grip, and therefore to apply braking pressure to the associated brake drum. The screw on the right side of the machine is a right hand screw, while the screw on the left side of the machine is a left hand screw.

There are two gears 64, one associated with each of the screws 63. Each gear 64 is in mesh with the adjacent gear 66; and these two gears are respectively in mesh with the gear 67 which is fixed to the lower end of the rotatable steering post 68 mounted on the main frame and provided with a steering wheel 69, at its upper end. It is evident that by turning this wheel to the right the brake band will be tightened on the right brake drum, and the left hand brake band will be correspondingly loosened; wherefore the traction belt on the left side of the machine will be caused to travel faster than the traction belt on the other side, with the result that the tractor will be steered to the right. By turning the steering wheel to the left the opposite result will be produced and the tractor will be steered toward the left.

By applying one or the other of the brake bands more or less, any desired degree of difference in speeds between the two driving shafts 33, and consequently between the two traction belts on opposite sides of the tractor may be brought about with the result that the tractor may be steered in as wide or short a curve as is desirable; in fact, the tractor can be made to turn in a circle whose radius is only a little greater than the distance between the outer edges of the two traction belts.

Having described my invention, I claim:—

1. In a tractor, the combination of two alined driving shafts, differential gearing therebetween which includes a differential drum having elongated oppositely extended tubular hubs in which said driving shafts are rotatably mounted, means for rotating said differential drum, and means whereby either driving shaft may be positively turned in its bearings in the associated drum hub in the same direction as that in which the said drum is turning and whereby the other driving shaft will be positively turned in its bearings in the associated drum hub but in the opposite direction to that in which the drum is turned.

2. In a motor vehicle, the combination of a gear casing, a differential drum having two oppositely extended alined tubular hubs which are rotatably mounted in said gear casing, two driving shafts which are respectively mounted to rotate in the two drum hubs, differential mechanism mounted upon said differential drum for driving the two driving shafts, and mechanism operable while the drum is rotating whereby either driving shaft may be positively turned in its bearings in the associated drum in the same direction as that in which said drum is turned, and the other driving shaft will be positively turned in its bearings in the associated drum hub but in the opposite direction to that in which the drum is turned.

3. In a motor vehicle, the combination of a gear casing, a differential drum having two oppositely extended alined tubular hubs which are rotatably mounted in said gear casing, two driving shafts which are respectively mounted to rotate in said drum hubs, two brake drums which are respectively mounted to rotate on the two hubs of said drum, means for applying braking pressure independently to said two brake drums, and means carried by the differential drum intermediate of said brake drums and driving shafts whereby when the rate of revolution of either brake drum is checked the corresponding driving shaft will be positively turned in the associated drum hub and in the reverse direction to that in which said drum is turning and the other driving shaft will be positively turned in its associated drum hub in the same direction in which said drum hub is turning.

4. In a motor vehicle, the combination of a gear casing, a differential drum having two oppositely extended alined tubular hubs which are rotatably mounted in said gear casing, two driving shafts which are respectively mounted to rotate in said drum hubs, gears which are disposed within said drum and are respectively fixed to the inner ends of said driving shafts, a set of compensating pinions mounted in the drum in mesh with one of said gears, a second set of compensating pinions mounted in said drum in mesh with the other gear and with pinions of the other set,—one pinion of each set being secured to a rotatable shaft which extends through an end wall of the drum and has a gear on its outer end, two brake drums rotatable upon the hubs of said differential drum each carrying a pinion which pinions respectively mesh with the two gears fixed to the compensating pinions, and means to independently apply the braking pressure to the two brake drums.

5. In a chain belt tractor, the combination of a main frame, a gear case fixed thereto, two traction frames located on opposite sides of the main frame and pivoted near their rear ends to said main frame on alined horizontal transverse axes, a driving sprocket mounted on each traction frame and provided with an internal gear, a second traction wheel mounted in the front end of each traction frame, a chain link belt track embracing each pair of associated traction wheels, a differential drum having elongated oppositely extended hubs which are rotatably mounted in said gear case, two driving shafts rotatably mounted in the hubs of said differential drum, pinions on the outer ends of said driving shafts respectively engaging the two internal gears, spur gears respectively fixed to the inner ends of said driving shafts within the gear case, a set of compensating pinions rotatably mounted within said drum and engaging with the gear on the inner end of one of the driving shafts, another set of compensating pinions rotatably mounted within the drum and engaging with the gear on the inner end of the other driving shaft and with compensating pinions of the first named set, one compensating pinion of one set being fixed to a rotatable shaft which projects through one end of the differential drum, and one pinion of the other set of compensating pinions being also fixed to a rotatable shaft which projects through the opposite end of said drum, a gear fixed to the outer end of each of said shafts, two brake drums respectively mounted on the two hubs of the differential drum,—the hub of each drum being provided with a pinion, which pinions respectively mesh with the two gears secured to said compensating pinions, and means for applying braking pressure to either of said brake drums at will.

6. In a chain belt tractor, the combination of a main frame, a gear case fixed thereto, two traction frames located on opposite sides of the main frame and pivoted near their rear ends to said main frame on alined horizontal transverse axes, a driving sprocket mounted on each traction frame and provided with an internal gear, a second traction wheel mounted in the front end of each traction frame, a chain link belt embracing each pair of associated traction wheels, a differential drum having elongated oppositely extended hubs which are rotatably mounted in said gear case, two driving shafts rotatably mounted in the hubs of said differential drum, pinions on the outer ends of said driving shaft respectively engaging the two internal gears, spur gears respectively fixed to the inner ends of said driving shafts within the gear case, a set of compensating pinions rotatably mounted within said drum and engaging with the gear on the inner end of one of the driving shafts, another series of compensating pinions rotatably mounted within the drum and engaging with the gear on the other driving shaft and with compensating pinions of the first mentioned set, one compensating pinion of one set being fixed to a rotatable shaft which projects through one end of the differential drum, and one pinion of the other set of compensating pinions being also fixed to a rotatable shaft which projects through the opposite end of said drum, a gear fixed to the outer end of said shafts, two brake drums respectively mounted on the two hubs of the differential drum,—the hub of each drum being provided with a pinion, which pinions respectively mesh with the two gears secured to said compensating pinions, a steering post carrying a gear, two trains of gears simultaneously operable by the gear on the steering post, and mechanism operable by said trains of gears for selectively applying braking pressure to either one of said brake drums and for at the same time positively relieving the other brake drum from effective braking pressure.

7. In mechanism of the character described, the combination of a differential drum, driving shafts which project into said drum from opposite ends thereof, a gear fixed to each of said driving shafts, two sets of compensating pinions which are rotatably mounted upon said drum,—the pinions of one set being in mesh with the gear fixed to one of the driving shafts, and the pinions of the other set being in mesh with the gear fixed to the other driving shaft and to the pinions of the first mentioned set, and means operable while the drum is in rotation for turning a compensating pinion of either set about its own axis.

8. In mechanism of the character described, the combination of two driving shafts, spur gears fixed respectively to said shafts, a rotatable differential drum, two sets of intermeshing compensating spur pinions mounted upon the said drum, one of the compensating pinions of one set being in mesh with the spur gear on one driving shaft, and the compensating pinions of the other set being in mesh with the spur gear on the other driving shaft, and means operable while the drum is rotating for selectively turning upon its axis a compensating pinion of either set.

9. In mechanism of the character described, the combination of a rotatable differential drum, two driving shafts coaxial therewith, gears on said driving shafts, two sets of intermeshing compensating pinions for transmitting motion through said gears from the differential drum to said driving shafts and from one driving shaft to the other, two short shafts which are parallel with the axis of the drum and are mounted thereon and project through opposite end walls of the drum,—one having a driving connection with a compensating pinion of one set and the other having a driving connection with a compensating pinion of the other set, and means engaging the projecting outer ends of said short shafts for selectively turning either in its bearings upon said drum while the drum is rotating.

10. In mechanism of the character described, the combination of a rotatable differential drum, driving shafts having their inner ends extended into said differential drum, a short shaft extending into said differential drum and mounted to turn in a bearing on said differential drum, means operatively connected with the end of said shaft outside of said differential drum to compel at will the rotation of said short shaft about its axis, and differential gearing within said drum interposed between said short shaft and the inner ends of said driving shafts and subject to actuation both by the turning of said differential drum about its axis and by the turning of said short shaft about its axis.

11. In mechanism of the character described, the combination of a differential drum, driving shafts having their inner ends extended into said differential drum, differential gearing interposed between said differential drum and the inner ends of said driving shafts for transmitting rotary motion from said drum to said driving shafts differentially and including a compensating pinion shaft mounted in bearings in and having one end extended outside of said drum, and means outside of said drum for turning said compensating pinion shaft about its axis to vary at will the normal action of said differential gearing with respect to said driving shafts.

12. In mechanism of the character described, the combination of a differential drum, driving shafts having their inner ends extended into said differential drum, gears on the inner ends of said driving shafts respectively, compensating pinions coacting with said gears, and means for varying at will the normal action of said compensating pinions, comprising a shaft mounted in and extended through one wall of said differential drum and having within said differential drum a driving connection with one of said compensating pinions, and gearing outside said differential drum for turning said shaft in its bearings in said differential drum.

13. In mechanism of the character described, the combination of a differential drum, two driving shafts, two short shafts which are parallel with the driving shafts and are rotatably mounted on the differential drum and project respectively through opposite ends thereof, pinions fixed respectively to the outer ends of said short shafts, two control gears which are respectively mounted near the ends of the differential drum and coaxially therewith and are respectively in mesh with the two pinions on said short shafts, mechanism for selectively retarding the rotation of said control gears, and differential mechanism having driving connections with said two short shafts and constructed to transmit motion differentially to said two driving shafts.

14. In mechanism of the character described, the combination of a rotatable differential drum, two driving shafts which are coaxial with said drum and extend from opposite directions into the drum, spur gears fixed respectively to said axle shafts within said drum, two sets of intermeshing compensating spur pinions mounted upon said drum,—of which the pinions of one set mesh with one of said spur gears, and the pinions of the other set mesh with the other spur gear, two short shafts mounted on the drum and projected through opposite ends thereof, one of said shafts having a driving connection with a compensating pinion of one set and the other having a driving connection with a compensating pinion of the other set, gears fixed respectively to the projecting outer ends of said short shafts, brake drums mounted coaxially with said differential drum near opposite ends thereof, gears respectively fixed to said brake drums and meshing respectively with the gears fixed to the projecting ends of said short shafts, brakes for said brake drums, and means for selectively applying said brakes.

15. In mechanism of the character described, the combination of a differential drum having an extended hub, driving shafts which are coaxial with and have their inner ends extended into said differential drum, a short shaft extending into said differential drum and mounted to turn in a bearing on said differential drum, differential gearing within said differential drum interposed between said short shaft and the inner ends of said driving shafts and subject to actuation both by the rotation of said differential drum about its axis and the rotation of said short shaft about its axis, and gearing interposed between an extended hub of said differential drum, and the outer end of said short shaft for controlling at will the operation of said short shaft.

16. In mechanism of the character described, the combination of a differential drum having an extended hub, driving shafts having their inner ends extended into said differential drum, a short shaft extending into said differential drum and mounted to turn in a bearing on said differential drum, differential gearing within said differential drum interposed between said shaft and the inner ends of said driving shafts and subject to actuation both by the rotation of said differential drum about its axis and the rotation of said short shaft about its axis, and gearing interposed between the extended hub of said differential drum and the outer end of said short shaft for controlling at will the rotation of said short shaft about its own axis, comprising a brake drum loosely mounted upon said extended hub, a gear carried by said brake drum, a gear carried by the outer end of said short shaft and actuated by said gear carried by said brake drum, and means for applying braking pressure to said brake drum.

17. In mechanism of the character described, the combination of a differential drum having an extended hub, driving shafts having their inner ends extended into said differential drum, a shaft extending into said differential drum disposed parallel to said driven axles, extending through one end wall of said differential drum and mounted to turn in a bearing in said end wall, differential gearing within said differential drum interposed between said short shaft and the inner ends of said driving shafts and subject to actuation both by the rotation of said differential drum about its axis and the rotation of said shaft about its axis, and gearing mounted on the extended hub of said differential drum and operatively connected with the outer end of said shaft for controlling at will the rotation of said shaft.

18. In mechanism of the character described, the combination of a rotatable drum, two coaxially mounted driving shafts which project into the drum from opposite ends thereof, a gear fixed to each driving shaft within the drum, two short shafts mounted on the drum,—one associated with each driving shaft, mechanism for transmitting rotary motion from each short shaft to the associated driving shaft, a pinion fixed to the projecting outer end of each short shaft, a brake drum associated with each short shaft, a gear fixed to each brake drum in mesh with the pinion on the associated short shaft, and means for selectively braking the brake drums.

19. In mechanism of the character described, the combination of a differential drum, two coaxially mounted driving shafts which project into the drum through opposite ends thereof, gears fixed to said driving shafts within the drum, compensating pinions mounted on the drum for transmitting reverse rotary motion from one to the other of the two gears secured to the driving shafts, a short shaft which is parallel with the axle shafts and is mounted on the differential drum and projects out through one end wall thereof and has a driving connection with one of said compensating pinions, a pinion on the projecting outer end of said short shaft, a gear mounted coaxially with respect to said differential drum in mesh with the last mentioned pinion, and means to compel the last mentioned gear to turn at a slower rate than that at which the differential drum is turning.

20. In a motor vehicle, the combination of a rotatable differential drum, two driving shafts which are coaxial with said drum and extend from opposite directions into the drum, spur gears fixed respectively to said driving shafts within said drum, two sets of compensating spur pinions mounted on the drum,—of which the pinions of one set mesh with one of said spur gears and the pinions of the other set mesh with the other spur gear and with compensating pinions of the first mentioned set, two short shafts rotatively mounted on the drum and projected through opposite ends thereof, one of said shafts being coaxial with and being connected to a compensating pinion of one set and the other being coaxial with and being connected to a compensating pinion of the other set, gears fixed respectively to the projecting outer ends of said short shafts, brake drums mounted coaxially with said differential drum near opposite ends thereof, gears respectively fixed to said brake drums and meshing respectively with the gears fixed to the outer ends of said short shafts, brakes for said brake drums, and means for selectively applying the brakes to said brake drums.

21. In mechanism of the character described, the combination of a rotatable differential drum, two driving shafts which extend from opposite directions into the drum, spur gears fixed respectively to said driving shafts within said drum, intermeshing compensating spur pinions mounted upon said drum,—of which one compensating pinion is in mesh with one of said spur gears, and another compensating pinion is in mesh with the other spur gear, two short shafts mounted on the drum and projected through opposite ends thereof, one of said shafts having a driving connection with one compensating pinion and the other having a driving connection with the other compensating pinion, gears fixed respectively to the projecting outer ends of said short shafts, a steering device, and means adapted to be selectively operated thereby for turning either of the gears fixed to the outer ends of said short shafts.

In testimony whereof, I hereunto affix my signature.

ROLLIN H. WHITE.